United States Patent [19]

Faulkner

[11] Patent Number: 5,020,656

[45] Date of Patent: * Jun. 4, 1991

[54] FLAT TOP CONVEYOR

[76] Inventor: William G. Faulkner, 6608 Edgebrooke, Oklahoma City, Okla. 73132

[*] Notice: The portion of the term of this patent subsequent to Nov. 27, 2007 has been disclaimed.

[21] Appl. No.: 366,773

[22] Filed: Jun. 14, 1989

Related U.S. Application Data

[63] Continuation-in-part of Ser. No. 220,601, Jul. 18, 1988, Pat. No. 4,972,942.

[51] Int. Cl.⁵ .................. B65G 45/10; B65G 23/06; B65G 17/06
[52] U.S. Cl. .................................. 198/494; 198/834; 198/853
[58] Field of Search ........ 198/494, 497, 498, 851–853, 198/841, 834

[56] References Cited

U.S. PATENT DOCUMENTS

| | | | |
|---|---|---|---|
| 1,565,760 | 12/1925 | Sutherland | 198/853 |
| 2,045,646 | 6/1936 | Harris | 198/851 |
| 3,269,526 | 8/1966 | Imse et al. | 198/853 |
| 3,724,285 | 4/1973 | Lapeyre | 198/834 |
| 3,939,964 | 2/1976 | Poerink | 198/853 |
| 4,741,431 | 5/1988 | Whitehead | 198/494 |
| 4,832,187 | 5/1989 | Lapeyre | 198/853 |
| 4,858,753 | 8/1989 | Hodlewsky | 198/853 |
| 4,865,183 | 9/1989 | Hodlewsky et al. | 198/853 |

OTHER PUBLICATIONS

Exhibit B–Hoffmeyer advertisement.
Exhibit C–Rexnord advertisement.

Primary Examiner—Joseph E. Valenza
Attorney, Agent, or Firm—Dunlap, Codding, Peterson & Lee

[57] ABSTRACT

The present invention relates generally to conveyor belts and, more particularly, but not by way of limitation, to a conveyor belt having ribs formed on a lower surface thereof for moving particles generally outwardly toward the first and the second sides of link assemblies which form the conveyor belt, and to a conveyor belt constructed of modules shaped so that the interconnections between modules are offset between each link assembly and adjacent link assemblies, and a flight link having curved portions formed the faces thereof so product slides on the surfaces rather than being toppled and a conveyor belt with a tracking product groove to substantially limit lateral movement of the conveyor belt.

21 Claims, 8 Drawing Sheets

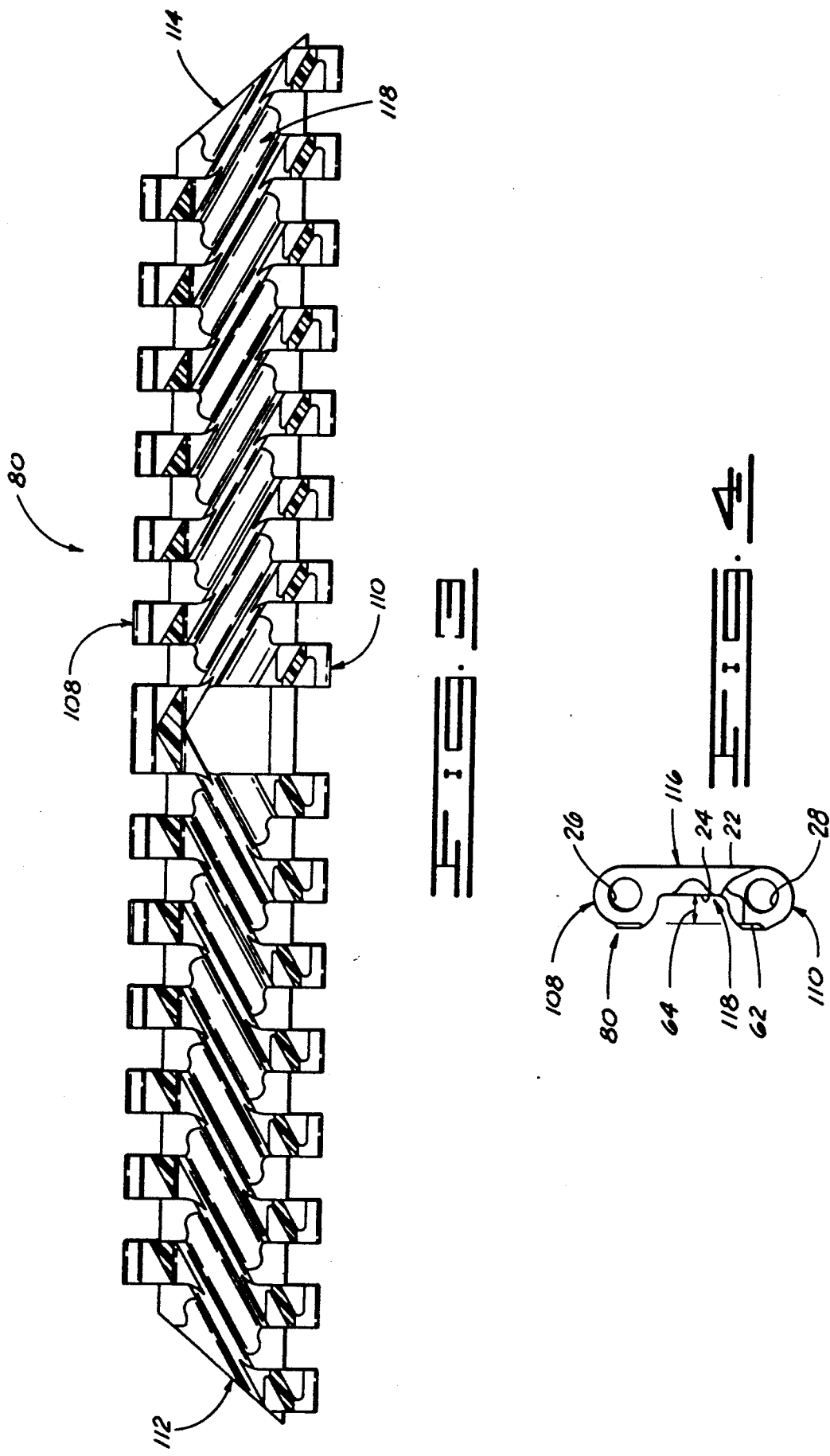

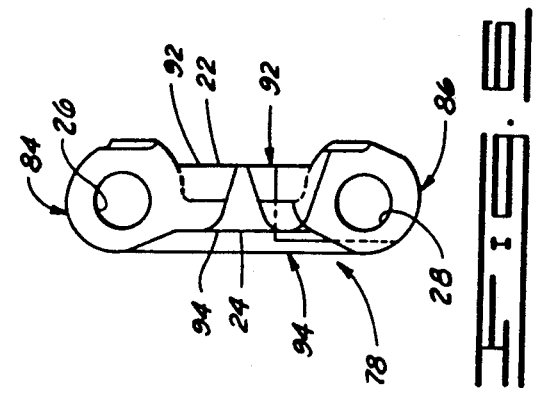
FIG. 6
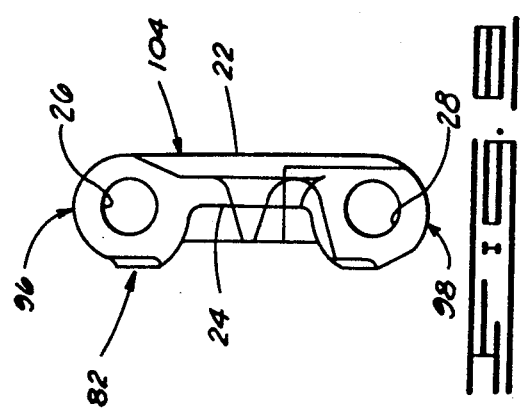
FIG. H
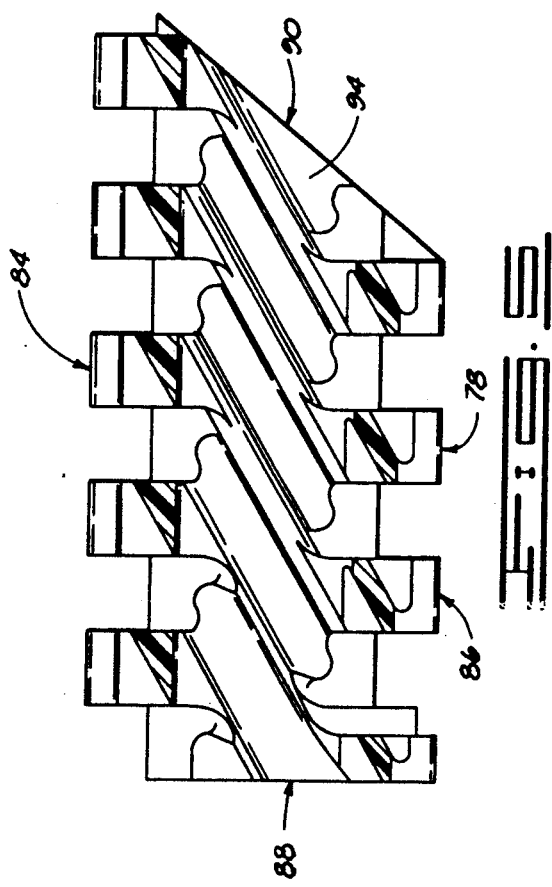
FIG. 5
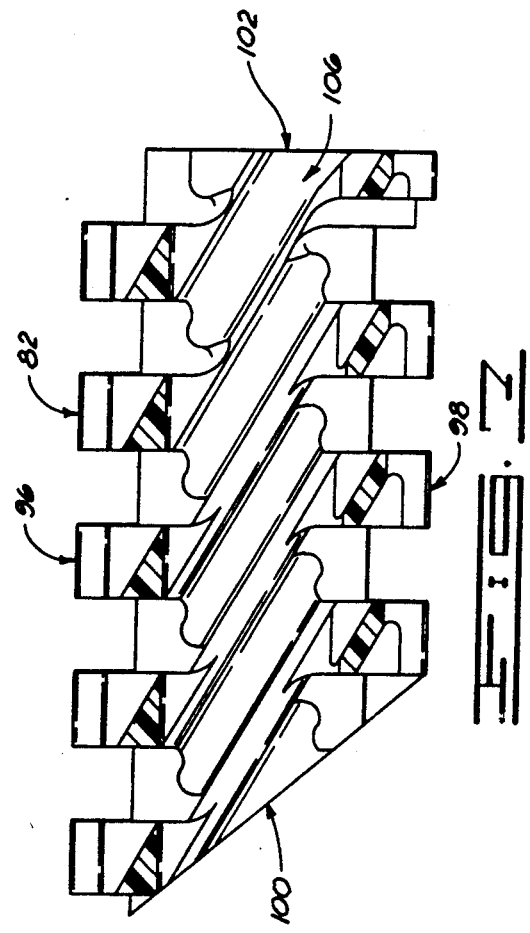
FIG. 7

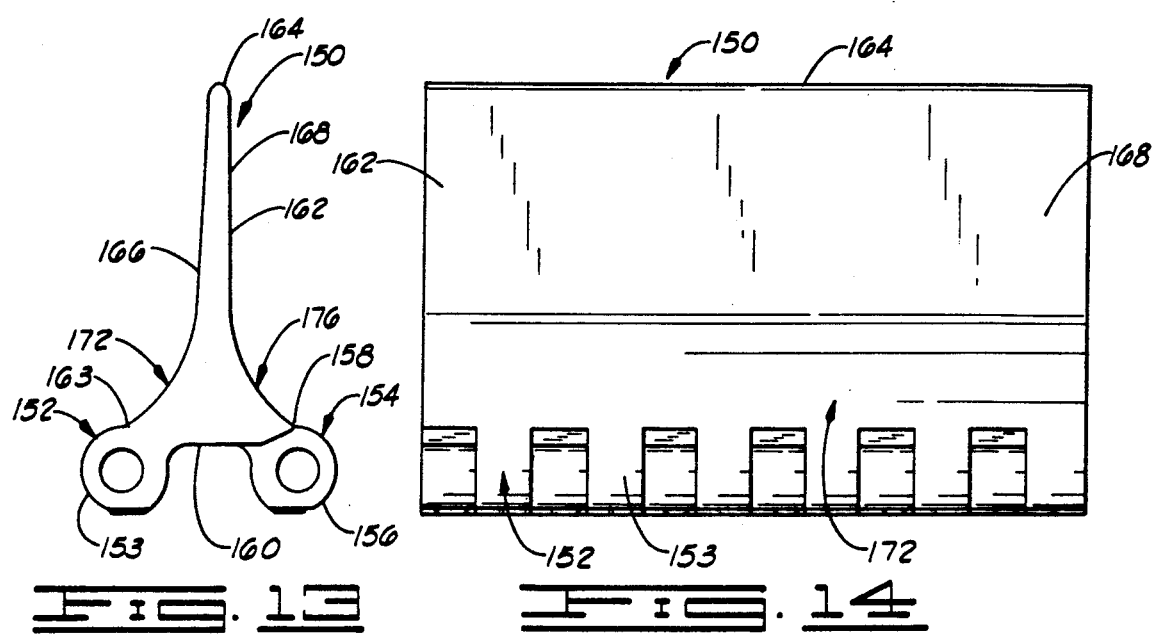
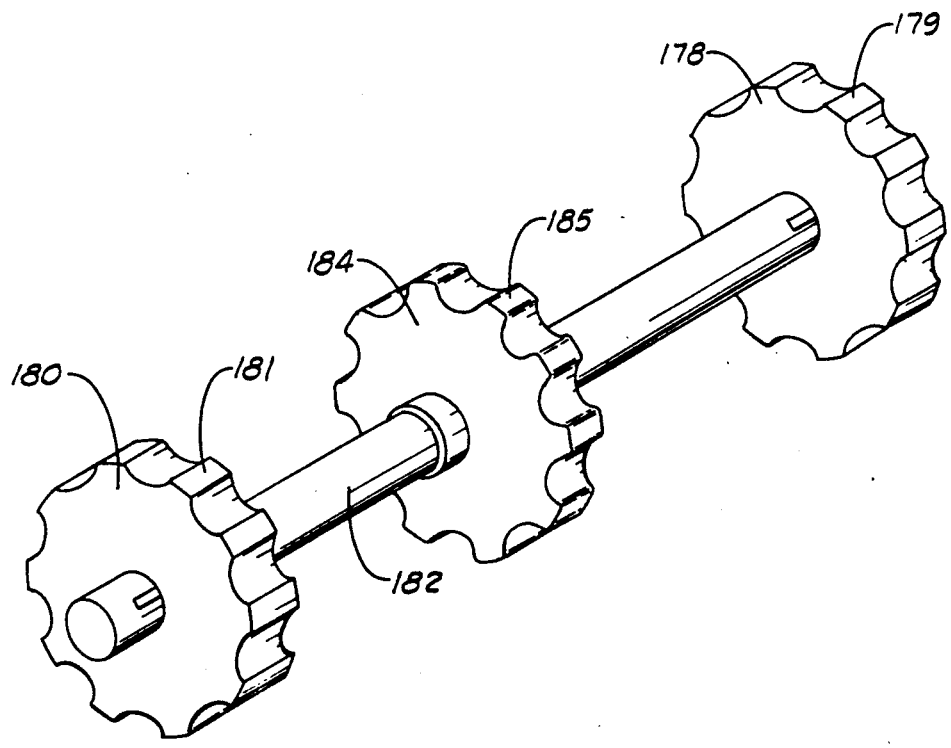

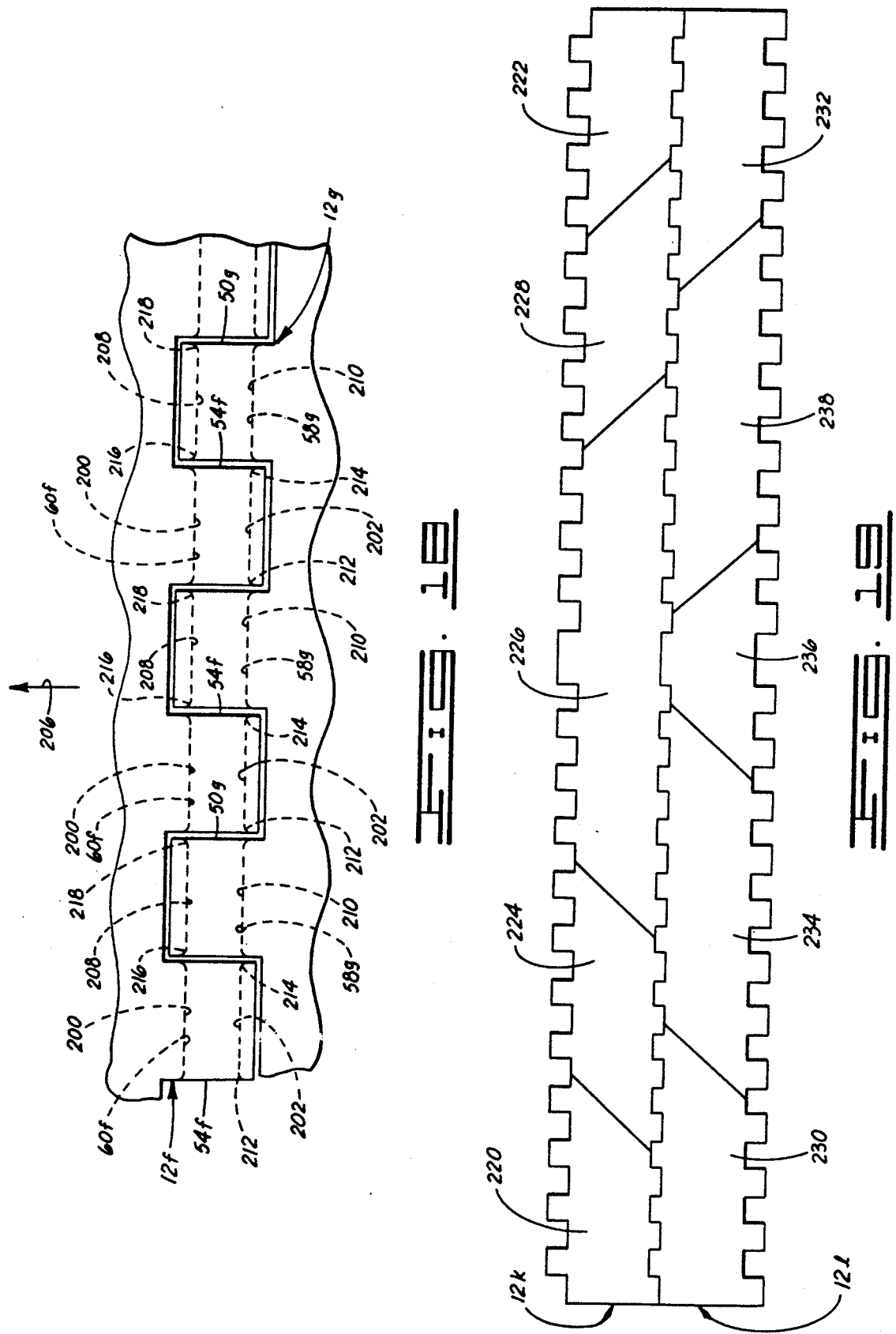

FLAT TOP CONVEYOR

CROSS REFERENCE TO RELATED APPLICATIONS

This application is a continuation-in-part of co-pending application entitled "Conveyor Belt"; Ser. No. 220,601; filed July 18, 1988, now U.S. Pat. No. 4,972,942, issued Nov. 27, 1990.

FIELD OF THE INVENTION

The present invention relates generally to conveyor belts and, more particularly, but not by way of limitation, to a conveyor belt having ribs formed on a lower surface thereof for moving particles generally outwardly toward the first and the second sides of link assemblies which form the conveyor belt, and to a conveyor belt constructed of modules shaped so that the interconnections between modules are offset between each link assembly and adjacent link assemblies, and a flight link having curved portions formed the faces thereof so product slides on the surfaces rather than being toppled and a conveyor belt with a tracking product groove to substantially limit lateral movement of the conveyor belt, and a conveyor belt supported on sprockets where the sprockets are movable to the belt laterally fixed to the shaft to allow for belt growth in width due to thermal and moisture variations.

BRIEF DESCRIPTION OF THE DRAWINGS

FIG. 3 is a bottom plan view of a central link module which is a portion of each of the link assemblies forming the conveyor belt.

FIG. 4 is an end view of the central link module shown in FIG. 3.

FIG. 5 is a bottom plan view of a first end link module forming a portion of each of the link assemblies.

FIG. 6 is an end view of the first end link module shown in FIG. 5.

FIG. 7 is a bottom plan view of a second end link module forming a portion of each of tee link assemblies.

FIG. 8 is an end view of the second end link module shown in FIG. 7.

FIG. 13 is an end elevational view of a flight link constructed in accordance with the present invention.

FIG. 14 is a front elevational view of the flight link of FIG. 13.

FIG. 15 is a diagrammatic view showing a typical sprocket arrangement for driving and tracking a conveyor belt constructed in accordance with the present invention.

FIG. 18 is a partial view schematically illustrating two link assemblies positioned to be interconnected by a link shaft showing modified projection link openings.

DESCRIPTION OF THE PREFERRED EMBODIMENTS

The description in the co-pending application entitled "Conveyor Belt"; Ser. No. 220,601; filed July 18, 1988, hereby specifically is incorporated herein by reference.

Figure 1:
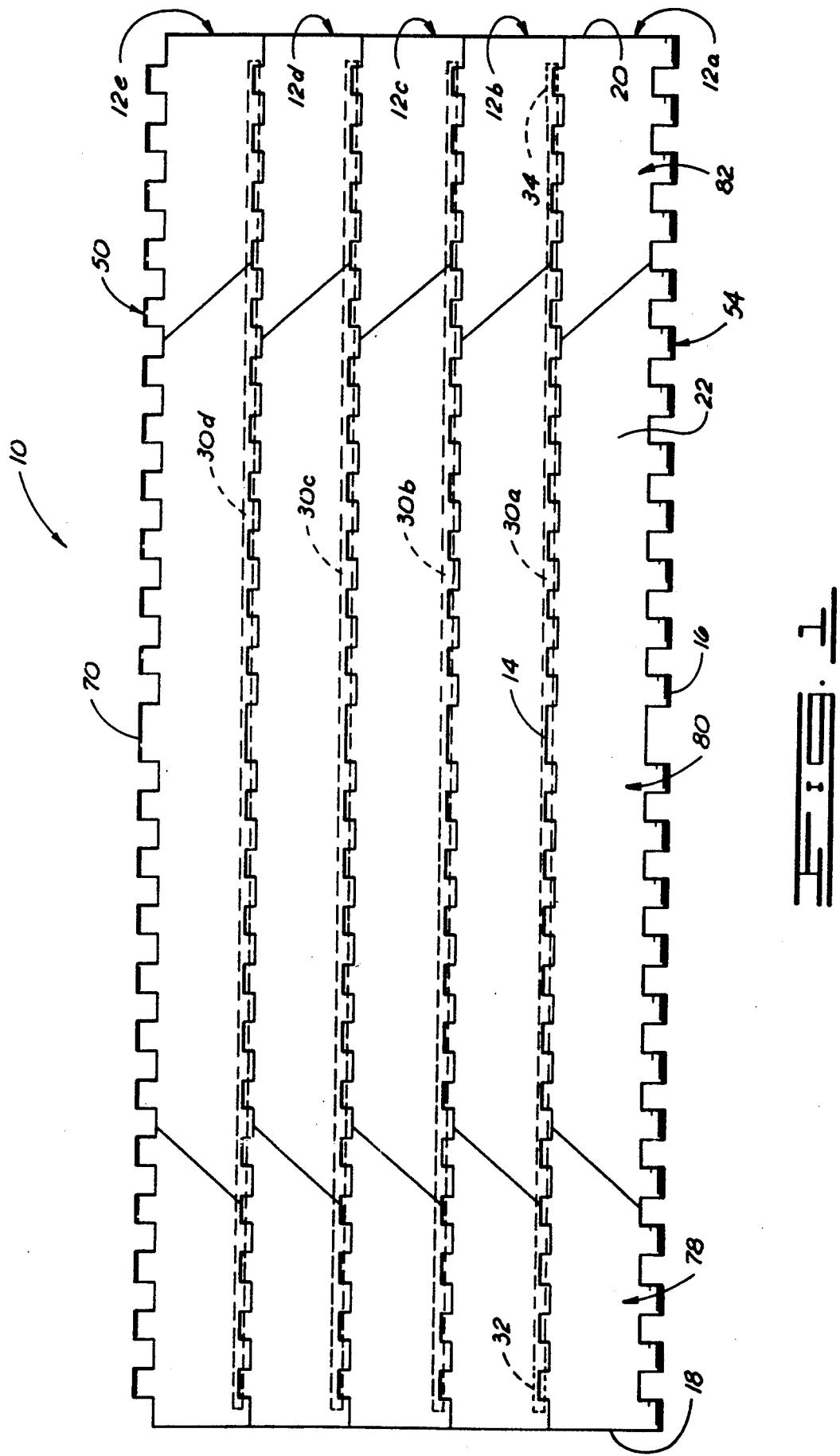
FIG. 1 is a top plan view of a portion of a conveyor belt constructed in accordance with the present invention, the portion of conveyor belt shown in FIG. 1 comprises only five link assemblies.
Figure 2:
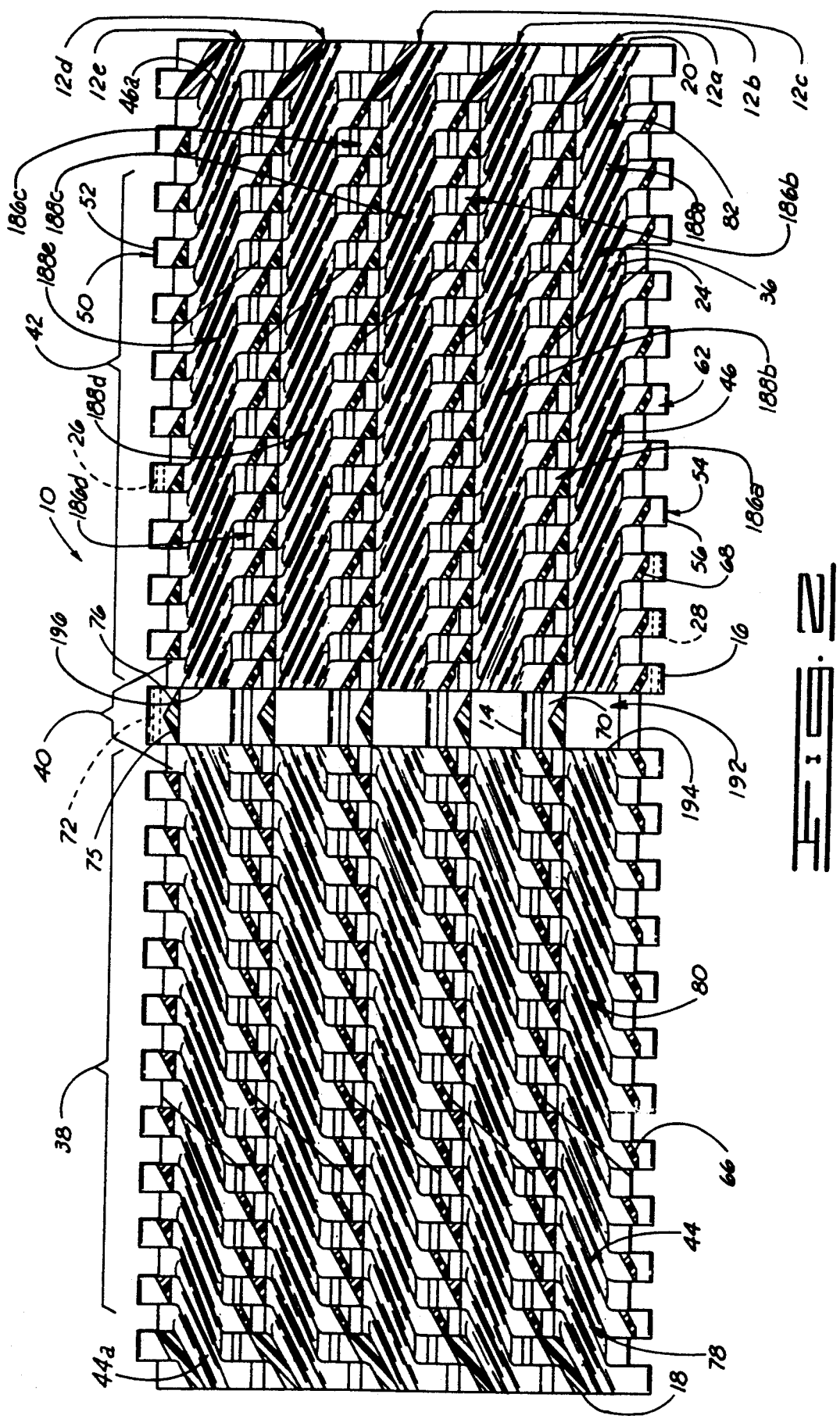
FIG. 2 is a bottom plan view of the conveyor belt shown in FIG. 1.

Shown in FIGS. 1 and 2 and designated therein by the general reference numeral 10 is a conveyor belt which is constructed in accordance with the present invention. The conveyor belt 10 comprises a plurality of link assemblies 12. Only a portion of the conveyor belt 10 is shown in FIGS. 1 and 2 and, more particularly, only five link assemblies 12 of the conveyor belt 10 are shown in FIGS. 1 and 2 wherein the five link assemblies are designated by the individual reference numerals 12a, 12b, 12c, 12d and 12e, respectfully. It is to be understood that a conveyor belt constructed in accordance with the present invention in practice will comprise a large number of link assemblies 12 interconnected to form an endless conveyor belt 10 which generally is extended about sprockets and used for conveying objects in a manner well known in the art.

As shown in FIGS. 1 and 2, each link assembly 12 has a forward end 14, a rearward end 16, a first side 18, a second side 20, an upper surface 22 (shown in FIG. 1) and a lower surface 24 (shown in FIG. 2). The forward and rearward ends 14 and 16, the first and the second sides 18 and 20 and the upper and the lower surfaces 22 and 24 are shown in FIGS. 1 and 2 and designated with specific reference numerals therein only with respect to the link assembly 12a.

Each link assembly 12 also includes a first shaft opening 26 (shown in FIG. 2) which extends generally between the first and the second sides 18 and 20 and which extends through the forward end 14 of each link assembly 12. Each link assembly 12 also includes a second shaft opening 28 (shown in FIG. 2) which extends through the rearward end 16 of each link assembly 12 and which extends generally between the first and the second sides 18 and 20 of each link assembly 12. The dotted lines showing the shaft openings 26 and 28 are only extending through each of the shaft projections 50 and 54.

The conveyor belt 10 also includes a plurality of link shafts 30 (FIGS. 1 and 2). Four link shafts 30 are shown in FIG. 1 in dashed lines and designated therein by the general reference numerals 30a, 30b, 30c and 30d. Each link shaft 30 extends through the first shaft opening 26 in one of the link assemblies 12 and through the second shaft opening 28 in another link assembly 12 for connecting the two link assemblies 12.

Each link shaft 30 includes a first end 32 and a second end 34, as shown in FIG. 1 with respect to the link shaft 30a. The first end 32 of each link shaft 30 is disposed generally near and spaced a distance from the first side 18 of one of the link assemblies 12 and the second end 34 of each link shaft 30 is disposed generally near and spaced a distance from the second side 20 of one of the link assemblies 12.

As shown in FIG. 2, a plurality of belt ribs 36 are formed on the lower surface 24 of each of the link assemblies 12. Each belt rib 36 is spaced a distance from the adjacent belt ribs 36. Each belt rib 36 extends at an angle generally between the forward end 14 and the rearward end 16 of each of the link assemblies 12. Each link assembly 12 comprises a first half 38 extending generally between the first side 18 and a central portion 40 of the link assembly 12 and a second half 42 extending generally between the second side 20 and the central portion 40 of each link assembly 12.

A plurality of spaced apart first belt ribs 44 (FIG. 2) are formed on the lower surface 24 of each link assembly 12. The first belt ribs 44 are disposed generally within the first half 38 of each link assembly 12. Each of the first belt ribs 44 extends generally between the forward end 14 and the rearward end 16 of one of the link assemblies 12. The first belt ribs 44 are angled generally from the forward end 14 toward the first side 18 of each link assembly 12. Each of the first belt ribs 44 extends a distance outwardly from the lower surface 24 of the link assembly 12.

Each link assembly 12 also includes a plurality of second belt ribs 46 (FIG. 2) formed on the lower surface 22 of each link assembly 12. The second belt ribs 46 are disposed generally within the second half 42 of each of the link assemblies 42. Each second belt rib 46 extends generally between the forward end 14 and the rearward end 16 of the link assemblies 12. Each of the second belt ribs 46 extends a distance at an angle generally from the forward end 14 of each of the link assemblies 12 generally toward the second side 20 of each of the link assemblies 12. Each of the second belt ribs 46 extends a distance generally outwardly from the lower surface 24 of each of the link assemblies 12.

A plurality of spaced apart forward shaft projections 50 (FIGS. 1 and 2) are formed on the forward end 16 of each of the link assemblies 12 (only one forward shaft projection 50 is designated with a reference numeral in FIGS. 1 and 2). Each of the forward shaft projections 50 extends a distance outwardly from the lower surface 24 of each of the link assemblies 12. Each of the forward shaft projections 50 extends a distance beyond the first and the second belt ribs 44 and 46 terminating with an outward end 52 (shown in FIG. 2 with respect to one of the forward shaft projections 50). The outward ends 52 of each of the forward shaft projections 50 are disposed in a common plane.

Each of the link assemblies 12 also includes a plurality of spaced apart rearward shaft projections 54 formed on the rearward end 16 of each of the link assemblies 12 (only one of the rearward shaft projections 54 designated with a reference numeral in FIGS. 1 and 2). Each of the rearward shaft projections 54 extends a distance outwardly from the lower surface 24 of each of the link assemblies 12 terminating with an outward end 56 (shown in FIG. 2 with respect to one of the rearward shaft projections 54). The outward ends 56 of the rearward shaft projections 54 are disposed in a common plane.

A projection link opening 26 is formed through each of the forward shaft projections 50 (shown in FIGS. 4, 6 and 8). A projection link opening 28f is formed through each of the rearward shaft projections 54. The projection link openings 26 are aligned and the projection link openings 28f are aligned.

The forward shaft projections 50 are spaced apart. The space between each of the forward shaft projections 50 is sized so that a rearward shaft projections 54 may be slidingly disposed in the space generally between two forward shaft projections 50.

The rearward shaft projections 54 are spaced apart. The space between two adjacent rearward shaft projections 54 is sized so that a forward shaft projection 50 may be slidingly disposed generally within the space formed between two adjacent rearward shaft projections 54. It should be noted that the shaft projections 50 and 54 may have uniform widths and the spaces between pairs of shaft projections 50 and 54 respectively also may be uniform for an overall uniform appearance, or these widths and spaces may vary in size to ensure proper orientation of the link assemblies 12 or for increasing shear or tensile strength in different regions of the belt width.

In the assembled position of the link assemblies 12, the outward ends 52 and 56 of the respective forward and rearward shaft projections 50 and 54 are disposed about in a co-planar disposition and cooperate to form a support surface 62 (FIG. 2) which is spaced a distance 64 (FIG. 4) from the lower surface 24 of the link assemblies 12.

A plurality of first support surface ribs 66 (one first support surface rib 66 being designated by reference numeral in FIG. 2) are formed on the support surface 62 formed by the forward and rearward shaft projections 50 and 54 disposed generally within the first halves 38 of the link assemblies 12. Each of the first support surface ribs 66 extends a distance outward from the outer ends 52 and 56, respectively. Each of the first support surface ribs 66 extends at an angle generally from the forward end 14 generally toward the first side 18 of each of the link assemblies 12.

A plurality of second support surface ribs 68 (one first support surface rib 68 being designated by reference numeral in FIG. 2) are formed on the portion of the support surface 62 formed by the forward and rearward shaft projections 50 and 54 disposed generally within the second halves 42 of the link assemblies 12. Each of the second support surface ribs 68 extends a distance outwardly from one of the outward ends 52 or 56 of the forward and rearward shaft projections 50 and 54, respectively. Each of the second support surface ribs 68 extends at an angle generally from the forward end 14 of one of the link assemblies 12 generally toward the second side 20 of one of the link assemblies 12.

A central shaft projection 70 (only one central shaft projection 70 is designated with a reference numeral in FIGS. 1 and 2) is formed on the lower surface 24 of each of the link assemblies 12. Each central shaft projection 70 extends a distance outwardly from the lower surface 24 of one of the link assemblies 12. Each central shaft projection 70 is disposed generally within the central portion 40 of one of the link assemblies 12. A projection link opening 72 (only one of the projection link openings 72 being shown in dashed lines and designated with a reference numeral in FIG. 2) is formed through a central portion of each of the central shaft projection 70.

Each of the central shaft projections 70 extends a distance outwardly from the lower surface 24 terminating with an outward end 74. A first central rib 75 (shown in FIG. 2 with respect to one of the first central ribs 75) is formed on each outward end 74 and each first central rib 75 extends at an angle generally from the forward end 14 toward the first side 18. A second central rib 76 is formed on each outward end 74 and each second central rib 76 (shown in FIG. 2 with respect to one of the second central ribs 76) extends at an angle generally from the forward end 14 toward the second side 20.

In an assembled position of the link assemblies 12, the forward end 14 of each of the link assemblies 12 is disposed generally near or adjacent the rearward end 16 of one of the other link assemblies 12. In this position, the forward shaft projections 50 are each disposed generally within the space between two adjacent rearward shaft projections 54 and each of the rearward shaft projections 54 is disposed generally within the space formed between two of the forward shaft projections 50. The central shaft projection 70 formed on each of the link assemblies 12 is disposed generally within the space formed between two rearward shaft projections 54. The projection link openings 26g, 28f and 72 are aligned. The aligned projection link openings 26g and 72 cooperate to form the first shaft opening 26 and the aligned projection link openings 28f and 72 cooperate to form the second shaft opening 28. In this connected position of two link assemblies 12, a link shaft 30 is disposed generally through the aligned projection link openings 26g, 28f and 72 to a position to wherein the first end 32 of each link shaft 30 is disposed generally near and spaced a distance from first side 18 of one of the link assemblies 12 and the second end 34 of each of the link shaft 30 is disposed generally near and spaced a distance from the second side 20 of each of the link assemblies 12.

In the interconnected position of the link assemblies 12 to form the conveyor belt 10, the first belt ribs 44 are disposed generally within the first halves 38 of each of the link assemblies 12 and each is angled outwardly from the central portions 40 toward the first side 18. The second belt ribs 46 are disposed generally within the second halves 42 of each of the link assemblies 12 and each is angled outwardly from the central portions 40 generally toward the second side 20. Further, the first support surface ribs 66 each are angled outwardly from the central portions 40 generally toward the first sides 18 and the second support surface ribs 68 each are angled outwardly from the central portions 40 toward the second sides 20. The first central ribs 75 also are angled outwardly generally from the central portions 40 toward the first side 18 and the second central ribs 76 are angled outwardly generally from the central portions 40 generally toward the second sides 20.

Each link assembly 12 comprises a first end link module 78, (shown in FIGS. 1, 2, 5 and 6), a central link module 80 (shown in FIGS. 1, 2, 3 and 4) and a second end link module 82 (shown in FIGS. 1, 2, 7 and 8). Only the modules 78, 80 and 82 for the link assembly 12a are designated with reference numerals in FIGS. 1 and 2.

As shown more clearly in FIGS. 5 and 6, the first end link module 78 has a forward end 84, a rearward end 86, a first side 88, a second side 90, an upper surface 92 and a lower surface 94. In an interconnected position of the modules to form the link assemblies 12, the first sides 88 of the first end link modules 78 cooperates to form the first sides 18 of the link assembly 12. The second side 90 of the first end link module 78 is formed at an angle.

As shown in FIGS. 7 and 8, the second end link module 82 has a forward end 96, a rearward end 98, a first side 100, a second side 102, an upper surface 104 and a lower surface 106. The second side 102 of the second end link module 82 cooperates to form the second sides 20 of the link assembly 12 in an interconnected position of the modules 78, 80 and 82. The first side 100 of the second end link module 82 is formed at an angle.

As shown more clearly in FIGS. 3 and 4, each central link module 80 has a forward end 108, a rearward end 110, a first side 112, a second side 114, an upper surface 116 and a lower surface 118. The first side 112 is formed at an angle so that the first side 112 of the central link module 80 mates with the second side 90 of the first end link module 78. The second side 114 of the central link module 80 is formed at an angle so that the second side 114 of the central link module 80 mates with the first side 100 of the second end link module 82.

It should be noted that the central link module 80 has an overall generally trapezoidal shape.

In an assembled form in a link assembly 12, the second side 90 of the first end link module 78 is disposed generally adjacent the first side 112 of the central link module 80. The second side 114 of the central link module 80 is disposed generally adjacent the first side 112 of the second end link module 82.

Because of the angled sides 90, 100, 112 and 114, the connections between first end link end modules 78 of adjacent link assemblies 12 are offset and the connections between the second end link modules 82 of adjacent link assemblies 12 also are offset. This offsetting interconnection between first and second end link modules 78 and 80 in adjacent link assemblies 12 results in a stronger overall conveyor belt 10 construction, while allowing each link assembly 12 to be uniform.

The link assemblies 12 preferably are constructed of a molded plastic or ceramic materials and the link shafts 30 also are constructed of a plastic or ceramic material.

Figure 9:
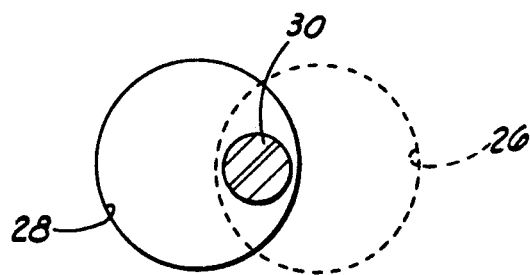
FIG. 9 is a diagrammatic view of a link shaft disposed through two projection link openings illustrating in exaggerated form the positions during the operation of the conveyor.

In one preferred form, as shown in FIG. 9, the projection link openings 26g in the forward shaft projections 50 generally are each circularly shaped and each has a diameter about equal to the diameter of the circularly shaped projection link openings 28f in the rearward shaft projects 54. The projection link opening 26g and 28f each have a diameter larger than the diameter of the link shafts 30.

In the operating position when the conveyor belt 10 is under tension, the forward shaft projections 50 tend to be pulled away from the rearward shaft projections 54 so that the projection link openings 26g and 28f are offset, as shown in a exaggerated form in FIG. 9. The link shaft 30 is disposed generally within the area or clearance between the two offset projection link openings 26g and 28f. The diameters of the link shaft openings 26g and 28f are sized to be large enough so that, in the assembled and operating position when the conveyor belt 10 is under tension, there is sufficient space within the projection link openings 26g and 60 occupied by the link shaft 30 so the link shaft 30 can rotate or roll on the surface formed by the projection link openings 26g and 28f in the respective forward and rearward projections 50 and 54 throughout the entire movement of the link shaft 30 as the conveyor belt 10 is moved about one of the sprockets. Preferably, the diameter of the projection link openings 26g and 28f are sized so that the link shaft 30 rolls over the surfaces formed by the projection link openings 58 and 28f at least a period of time in excess of fifty percent of the time that the belt is being moved about a sprocket or over some curved path. The rolling action of the link shafts 30 on the surfaces formed by the projection link openings 26g and 28f reduces the wear on the surfaces. It should be noted that the rolling action described before also can be expressed in terms of the surfaces formed by the projection link openings 26g and 28f rolling on the link shaft 30.

The diameters of the projection link openings 26g and 28f are sized so that the link shafts 30 roll on the surfaces formed in the forward shaft projections 50 by the projection link openings 26g when the conveyor belt 10 is moved over a curved path such as over a sprocket. Initially, the diameter of the link shafts 30 must be selected so the link shafts 30 will have sufficient shear strength for the particular application. For example, assume a link shaft diameter of 0.150 inches. The number of teeth in the sprockets then is determined. Assume a sprocket with 12 teeth for example. In this example, the link shaft 30 will rotate 30 degrees (360 12). The length of rolling contact from a horizontal centerline will be [(1/12)($\pi$)(0.150)=0.039 inches]. The rolling contact angle from incline of enlarged hole for a ¼ inch radius is (0.039)(360)(R)(2)($\pi$)] or the size of a straight line is [(0.039)(2)(0.150)=0.228].

When the conveyor belt 10 is moved over a radius such as about a sprocket, the link shaft 30 attempts to rotate in the clearance between the projection link openings 26g and 28f (see FIG. 9). As the link shaft 30 attempts to rotate further it sees friction. Since the opposing force is a rolling action with no friction, the link shaft 30 becomes stationary with respect to surface formed by the projection link opening 28f (FIG. 9). The surface formed by the projection link opening 26g rolls on the link shaft 30 until the link shaft 30 link openings 26g and 28f (the middle of this clearance).

The foregoing example assumes a 12 tooth sprocket. A 24 tooth sprocket would cause the surfaces to roll on the link shaft 30 only half way to the top of the clearance. A 6 tooth sprocket would cause the surfaces to roll on the link shaft 30 to the top of the clearance and then rotation would occur between the link shaft 30 and either or both surfaces formed by the projection link openings 26g and 28f.

Since wear is a function of friction between the surfaces sliding against each other and pressure, zero friction occurs during rotation. Utilizing the present design, the duration of friction is shortened by designing the radius of the surfaces formed by the projection link openings 26g and 28f so that the surfaces rollingly contact the link shaft 30 over a substantial period of the time the conveyor belt is moved about the sprocket, thereby substantially reducing wear on the link shaft 30.

By way of a second example, assume a diameter of 0.250 inches for the link shaft 30. The number of teeth in the sprockets is determined that the conveyor belt 10 is to roll over during sprocket to belt engagement. For this example, assume a 10 tooth sprocket. The link shaft 30 will rotate 36 degrees [360 10]. The length of rolling contact from horizontal centerline is 0.0236 [1/10×$\pi$×0.150/2]. The minimum size of the projection link opening 26g and 28f is 0.2972 inches [0.0236×2+—0.250]/ The rolling contact angle of either projection link opening 26g or 28f is 7.2 degrees assuming 0.375 inch diameter projection link openings 26g or 28f [(0.236)(360)(0.1875)(2)($\pi$)] or a size of a square line hole of 0.2972 inches [(0.0236)(2)+(2.5)].

In this last example, the surfaces will roll on link shaft 30 until the link shaft 30 has reached the bottom of the clearance, assuming the 10 tooth sprocket. A 20 tooth sprocket would cause the surfaces to roll on the link shaft 30 only half way to the 18 degrees. A 5 tooth sprocket would cause the surface to roll on the link shaft 30 until the surface becomes too steep and, at that point, rotation would occur between the link shaft 30 and either of the surfaces formed by the projection link openings 26g and 28f.

Figure 10:
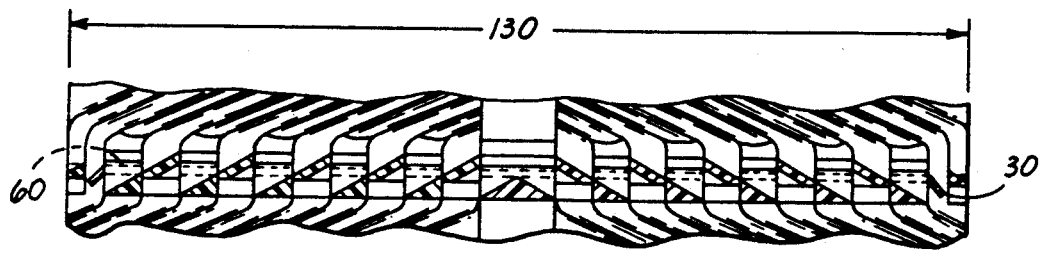
FIG. 10 is a diagrammatic view of a link assembly with a shaft disposed generally through the projection link openings.

The plastic rod shaped link shafts 30, normally are stored rolled about a reel so that a permanent bow is set in the length of material stored on the reel. The link shafts 30 are made from the reel of material by cutting the desired length of material from the length of material stored on the reel. The link shafts 30 constructed in this matter tend to bow or curl as indicated in FIG. 10. The length of the link shaft 30 is less than the width 130 of the conveyor belt 10 and with the link shaft 30 bowed, the ends 32 and 34 of the link shaft 30 tend to abut the last rearward shaft projections 54 and are not aligned with the projection link opening 28f formed therethrough. This abutment between the last rearward shaft projection 54, that is, the rearward shaft projection 54 generally adjacent the respective first and second sides 18 and 20 of the link assemblies 12, keeps the link shafts 30 in position interconnecting adjacent link assemblies 12 and prevents the link shafts 30 from being removed through the last rearward shaft projection 54. When it is desired to remove the link shaft 30 for disassembling a adjacent link assemblies 12, the end 32 or 34 can be bent slightly into alignment with the projection link opening 28f in the rearward shaft projection 54 generally adjacent the first or the second side 18 or 20 of the link assembly 12 and the link shaft 30 then can be removed through all of the projection link openings 26g and 28f. It should be noted that this design feature may not be desirable in all applications.

Figure 11:
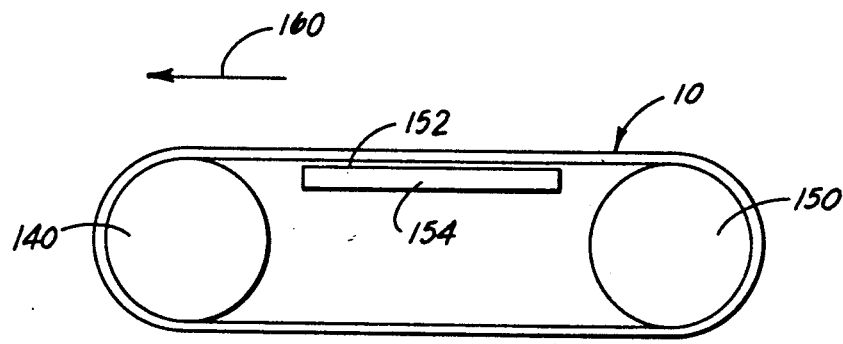
FIG. 11 is a diagrammatic view showing a conveyor belt constructed in accordance with the present invention operatively disposed about two sprockets.

Shown in FIG. 11 is a conveyor belt 10 (diagrammatically shown) operatively connected to two sprockets 140 and 150. A portion of the conveyor belt 10 rides on a support surface 152 of a support 154. In typical operating environments for the conveyor belt 10, it is common for the conveyor belt 10 to ride on a support surface such as the support surface 152.

When the conveyor belt 10 or the upper portion thereof is being moved in the direction 160 over the support surface 152, the support surface ribs 68 and 70 form on the forward and rearward shaft projections 50 and 54, respectively, tend to engage the support surface 152 and move any material which may be disposed on the support surface 152 generally toward the first or the second sides 18 or 20 of the link assemblies 12 thereby tending to remove material from the support surface 152. Further, the belt ribs 44 and 46 and the support surfaces ribs 66 and 68 when moving over the surface 150 cooperate to move any material which may be deposited on the lower surface 24 of the conveyor 10 outwardly toward the first and second sides 18 and 20 thereby tending to auger clean such materials from the conveyor belt 10.

Figure 12:
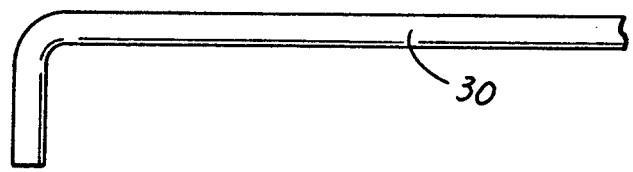
FIG. 12 is a view of one end of a link shaft illustrating one technique for retaining the link shafts in position connecting two link assemblies.

As shown in FIG. 12 and in one preferred form, the end 32 of each of the link shafts 30 is bent at an angle to prevent the link shafts 30 from exiting through the two rearward shaft projections 54 disposed generally at the first side 18 of each of the link assemblies 12 thereby preventing the link shafts 30 from moving through the projection link openings 28f in these two rearward shaft projections 54 to secure the link shafts 30 in an assembled position. This construction is in lieu of the construction shown in FIG. 10 and described in detail before.

Shown in FIGS. 13 and 14 is a typical flight link 150 constructed in accordance with the present invention. The flight link 150 has a plurality of spaced apart forward shaft projections 152 formed on a forward end 153 thereof and a plurality of spaced apart rearward shaft projections 154 formed on a rearward end 156 thereof.

The flight links 150 are adapted to be interposed between two adjacent link assemblies 12 and the flight links 150 cooperate to connect two adjacent link assemblies 12. The flight links 150 are spaced a distance apart over the length of a conveyor belt 10 and interposed between adjacent link assemblies 12 in some applications.

Each flight link 150 has an upper surface 158 and a lower surface 160. Each flight link 150 includes a flight 162 which extends a distance generally upwardly from the upper surface 158 of the flight link 150 terminating with an upper end 164. Each flight 162 has a forward face 166 and a rearward face 168.

A portion of the forward face 166 of each flight 162 generally starting at the lower end 163 thereof and extending a distance generally upwardly toward the upper end 164 thereof is formed on a radius 170 thereby forming a curved portion 172 on each forward face 166. The radius 170 and the curved portion 172 each are sized, so that during the operation of the conveyor, material, such as a potato chip, tends to move or slide over the curved portion 172 without being flipped or overturned. In essence, the material tends to wipe the curve portion 172 as the belt is moved from a horizontal toward an inclined position during the operation of the conveyor belt 10 with the flight link 150 operatively connected thereto.

The rearward face 168 of each flight 162 is formed on a radius 174 identical to the radius 170 thereby forming a curved portion 176 which is identical to the curved portion 172. The curved portion 176 is constructed and operates in the manner exactly like the curved portion 172 described in detailed before.

In the manufacture of food products such as potato chips, it frequently is required to elevate these products. Quite often this is done on an included conveyor. To prevent products from slipping back on these include conveyors, upright lateral fences, called cleats or flights, are periodically spaced on the conveyor belt. The prior cleats generally have been "T" shaped with only a minimum radius, generally less than ⅛ inch, at the junction between the horizontal and vertical members.

In general, the larger radius for the curved portions 172 and 176 permits small and large product to slide on the belt and flight 162. The sliding is caused by the product trying to lower its center of gravity.

The maximum symmetrical radius for the curved portions 172 and 176 is about 0.80×Pitch. The maximum one side radius for the curved portions 172 and 176 is about 1.6×Pitch. The maximum 2 Pitch, flight 162 radius for the curved portions 172 and 176 is about 3.2×Pitch. For example, a 3 inch disk will slide on a 1.5 inch radius.

The products will vary in shape and size. Most such disk shaped products will have a diameter of about ⅜ inch and large product will have a diameter less than 4 inches. nI conveyors with such prior flights and without the curved portion 172, material, such as potato chips, tends to be flipped or turned over thereby causing oil and seasoning to be dislodged from the potato chip. This dislodged oil and seasoning tends to build up in the area generally adjacent the lower end 158 or 163 of the flight 162 and the flight link. This causes a loss of seasoning and, when such build up becomes dislodged, can cause an excess amount of seasoning to be deposited in a bag of potato chips. These problems are eliminated with the flight links 150. Further, the sliding action tends to wipe the curved portions 172 and 176 clean, thereby reducing sanitation requirements and reducing product contaminations from waste buildup.

Figure 16:
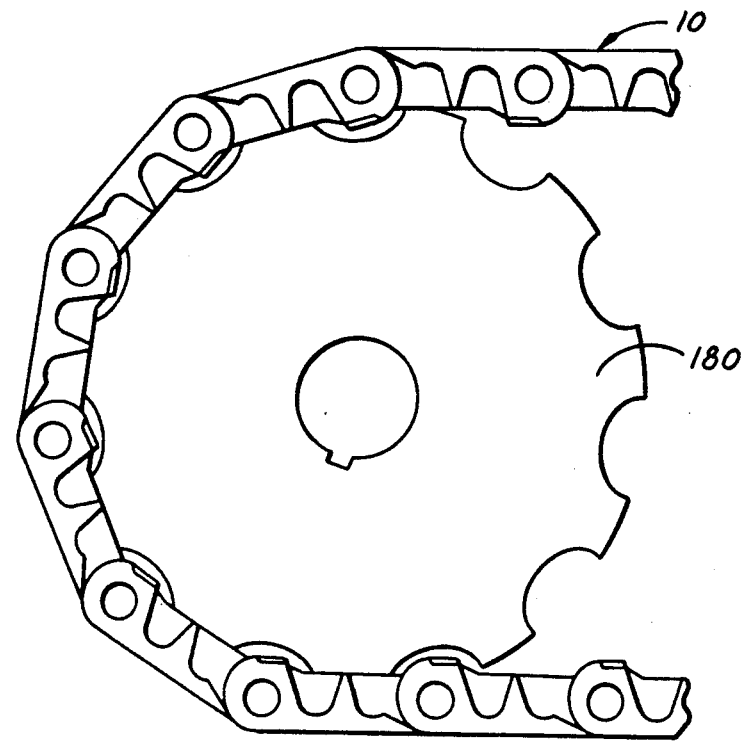
FIG. 16 is an end elevational view showing a drive sprocket operative connected to a conveyor belt constructed in accordance with the present invention.
Figure 17:
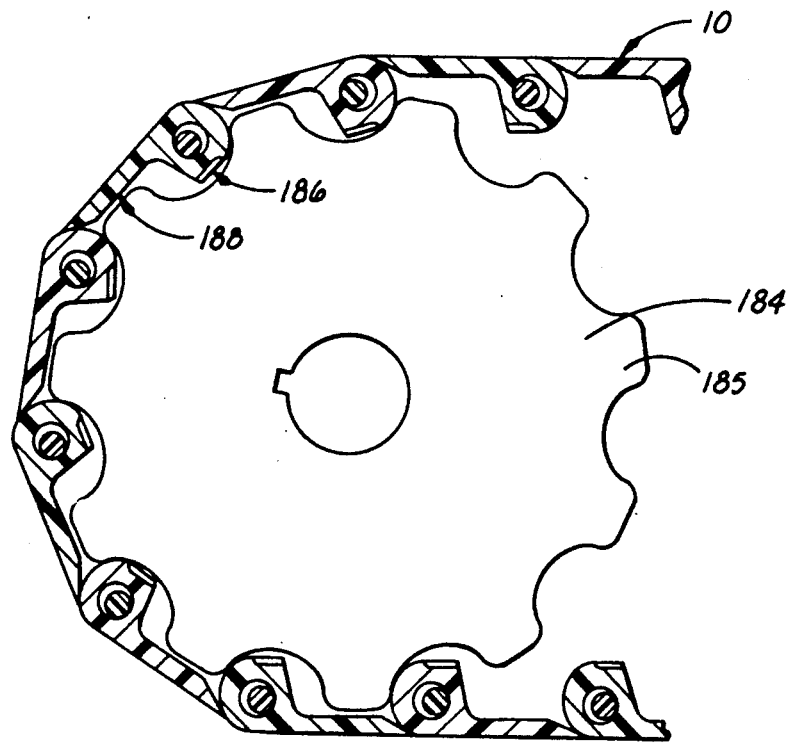
FIG. 17 is a sectional view showing a tracking sprocket operatively connected to a conveyor belt constructed in accordance with the present invention.

As mentioned before in connection with FIG. 11, the conveyor belt 10 of the present invention generally is extended about drive sprockets. Shown in FIG. 16 is a typical sprocket arrangement for driving a conveyor belt such as the conveyor belt 10. In this example, there are two drive sprockets 178 and 180, each mounted on a drive shaft 182 with one of the drive sprockets 178 being disposed generally near one end of the drive shaft 182 and the other drive sprocket 180 being disposed generally near the opposite end of the drive shaft 182. Positioned generally midway between drive sprockets 178 and 180 is a tracking sprocket 184.

The drive sprocket 179 has a plurality of teeth 179. The drive sprocket 180 has a plurality of teeth 181, the tracking sprocket 184 has a plurality of teeth 185.

The sprockets 178, 180 and 184 each are identical in construction, except the tracking sprocket 184 is slightly larger in diameter than the drive sprockets 178 and 180 for reasons which will be made more apparent below.

The tracking sprocket 184 functions to maintain the lateral position of the conveyor belt 10 during the operation of the conveyor belt 10. The drive sprockets 178 and 180 function to drivingly move the conveyor belt 10. The drive shaft 182 is connected to a driver such as an electric motor which drivingly rotates the drive shaft 182. The drive sprockets 178 and 180 each are keyed to the drive shaft 182 such that the drive rotation of the drive shaft 182 drivingly rotates the drive sprockets 178 and 180. The drive sprockets 178 and 180 each are fixed to the drive shaft 182. The tracking sprocket 184 also may be keyed to the drive shaft 182. The tracking sprocket 184 is positioned laterally on the drive shaft 182 by collars (only one collar being shown in FIG. 15 and designated by the reference numeral 183) in such a manner that the tracking sprocket 184 is disposed and maintained at a fixed position laterally on the drive shaft 182.

As shown in FIG. 2 and in an assembled position of the link assemblies 12 to form the conveyor belt 10, the adjacent forward and rearward shaft projections 50 and 52 cooperate to form a series of spaced apart ridges 186, four ridges 186 being shown in FIG. 2 and designated therein by the reference numerals 186a, 186b, 186c and 186d. Each of the ridges 186 projects a distance upwardly and outwardly from the lower surface 24 of one of the link assemblies 12 thereby forming a groove 188 generally between each pair of the ridges 186, three grooves 188 being shown in FIG. 2 and designated therein by the reference numerals 188a, 188b and 188c. Each space between pairs of ridges 186 forming the groove 188 is sized to receive a tooth 179 or 181 on the drive sprocket 178 or 180. The teeth 179 and 181 on the drive sprockets 178 and 180 alternatively are disposed in the grooves 188 and engage the ridges 186 for drivingly moving the conveyor belt 10. The conveyor belt 10 can expand laterally during the operation over the drive sprockets 178 and 180 with the teeth 179 and 180 traveling with the groove 188, thereby allowing for belt growth in width due to thermal and moisture variations.

A tracking sprocket groove 192 is formed in the lower surface 24 of each of the link assemblies 12, as shown in FIG. 2. Each tracking sprocket groove 192 extends generally between the forward end 14 and the rearward 16 of each of the link assemblies 12. The tracking sprocket groove 194 forms a left engaging surface 194 extending generally between the forward end and the rearward end 16 of each of the link assemblies 12 and a right engaging surface 196 extending generally between the forward 14 and the rearward end 16 of each of the link assemblies 12.

In an assembled position of the link assemblies 12 the tracking sprocket grooves 192 in the link assemblies 12 are aligned and the central shaft projections 70 are spaced apart generally along the groove formed by the tracking sprocket grooves 192. Each of the tracking sprocket grooves 192 is sized to receive a tooth on the tracking sprocket 194 such that the tooth 194 is disposed in the groove 188 and confined therein by the left engaging surface 194 and the right engaging surface 196, the left and right engaging surfaces 194 and 196 engaging opposite sides of the tooth disposed in the groove 188. The engagement between the teeth 185 of the tracking sprocket 184 and the left and right engaging surfaces 194 and 196 cooperate to enable the tracking sprocket 184 to maintain the lateral position of the conveyor belt during the operation thereof. The teeth 185 on the tracking sprocket 184 alternatively are disposed in one of the grooves 192 and engage one of the central shaft projections 70 so that the tracking sprocket 184 is rotated generally following the rotation of the drive sprockets 178 and 180.

The belt rib 44a (FIG. 2) disposed generally adjacent the first side 18 of each link assembly 12 extends from lower surface 24 a distance greater than the remaining belt ribs 44 for engaging the sprocket 180 and preventing the sprocket 180 from moving along the drive shaft 182 beyond the first side 18 if the sprocket 180 become unfixed to the drive shaft 182. The belt 46a (FIG. 2) disposed generally adjacent the second side 20 of each link assembly 12 extends from the lower surface 24 a distance greater than the remaining belt ribs 46 for engaging the sprocket 178 and preventing the sprocket 178 from moving along the drive shaft 182 beyond the second side 20, if the sprocket 178 becomes unfixed to the drive shaft.

Shown in FIG. 18 is a portion of two link assemblies 12f and 12g which are constructed exactly like the link assemblies 12 described before, except portions of the walls formed in the shaft projections 50g and 54f are rounded. The projection link openings 28f extend through each of the rearward shaft projections 54f of each of the link assemblies forming a forward wall 200 and a rearward wall 202, the terms "forward" and "rearward" being relative to a direction of travel 206 of the conveyor belt. The projection link openings 26g extend through each of the forward shaft projections 28g of each of the link assemblies forming a forward wall 208 and a rearward wall 210.

The edges of rearward wall 202 in each rearward shaft projection 54f where the projection link opening 60f intersects the sides of the rearward shaft projection 54f are rounded at 212 and 214. The edges of the forward wall 208 in each forward, shaft projection 50g where the projection link opening 26g intersects the sides of the forward shaft projection 50g are rounded at 216 and 218. The rounding of the edges at 212, 214, 216 and 218 facilitates the forming of the link shaft 30 in the sine wave like form as described in Applicant's co-pending application referred to before.

Shown in FIG. 19 are two modified link assemblies 12k and 12l. The link assembly 12k includes two end modules 220 and 222 and three intermediate modules 224, 226 and 228. The link assembly 12l includes two end modules 230 and 232 and three intermediate modules 234, 236 and 238. The ends of each of the modules 220, 222, 224, 226, 228, 230, 232, 234, 236 and 238, which are adjacent the end of another module 220, 222, 224, 226, 228, 230, 232, 234, 236 and/or 238 are angled in a manner like the modules 78, 80 and 82 described in detail before. Each module 220, 222, 224, 226, 228, 230, 232, 234, modules 220, 222, 224, 226 and 228 in the link assembly 12k are offset with respect to the adjoining edges between the modules 230, 232, 234, 236 and 238 in the link assembly 12l. The offsetting of these adjoining edges enhances the overall strength of the conveyor belt.

Changes may be made in the construction and operation of the various elements and components described herein and changes may be made in the steps or sequence of steps of the methods described herein without departing from the spirit and scope of the invention as defined in the following claims.

What is claimed is:

1. A conveyor belt wherein the conveyor belt moves over a support surface at least a portion of the time during the operation of the conveyor belt and wherein the conveyor belt is adapted to clean material deposited from the support surface while the conveyor belt is moving over the support surface, comprising:

a plurality of link assemblies, each link assembly having a forward end, a rearward side, an upper surface, a lower surface, a first side, and a second side, the forward end of each link assembly being connectable to the rearward side of one other link assembly for forming the conveyor belt, a plurality of spaced apart support surface ribs being formed on the lower surface of each link assembly, each support surface rib being spaced a distance from adjacent support surface ribs and each support surface rib extending at an angle generally between the forward end and the rearward end, the support surface ribs engaging the support surface as the conveyor belt is moved over the support surface whereby material on the support surface tends to be moved from the support surface for tending to clean material from the support surface; means for connecting the forward end of each link assembly to the rearward end of one other link assembly for forming the conveyor belt.

2. The conveyor belt of claim 1 wherein each link assembly comprises a first half extending from the first side of the link assembly a distance generally toward a central portion of the link assembly and a second half extending from the second side of each link assembly generally toward a central portion of the link assembly, and wherein the support surface ribs are defined further as comprising a plurality of first support surface ribs disposed generally within the first half of each link assembly with each first support surface rib extending at an angle generally toward the first side of each link assembly, and a plurality of second support surface ribs with each second support surface rib being disposed generally within the second half of each link assembly and each second support surface rib extending at an angle generally toward the second side of each link assembly.

3. The conveyor belt of claim 2 wherein the central portion of each link assembly is disposed generally between the first half and the second half of each link assembly, and wherein each link assembly further comprises at least one central rib having one portion formed at an angle extending generally toward the first end of each link assembly and a second portion formed at an angle extending generally toward the second end of each link assembly.

4. The conveyor belt of claim 1 wherein each link assembly is defined further to comprise:
a plurality of spaced apart forward shaft projections, each forward shaft projection being connected to the lower surface of each link assembly and each forward shaft projection extending a distance generally outwardly from the lower surface of each link assembly terminating with an outward end, the forward shaft projections being disposed generally along the forward end of each link assembly;
a plurality of spaced apart rearward shaft projections, each rearward shaft projection being connected to the lower surface of each link assembly and each rearward shaft projection extending a distance generally outwardly from the lower surface of each link assembly terminating with an outward end, the rearward shaft projections being disposed generally along the forward end of each link assembly: and
wherein the support surface ribs are defined further as being connected to the outward ends of the forward and the rearward shaft projections with each of the support surface ribs extending a distance generally outwardly from the respective outward end of one of the forward or rearward shaft projections.

5. The conveyor belt of claim 4 wherein each link assembly comprises a first half extending from the first side a distance generally toward a central portion thereof and a second half extending from the second side generally toward the central portion of each link assembly, and wherein the support surface ribs are defined further as comprising a plurality of first support surface ribs with each first support surface rib being disposed in the first half of each link assembly and each first support surface rib extending at an angle generally toward the first end of each link assembly, and a plurality of second support surface ribs disposed generally within the second half of each link assembly with each second support surface rib extending at an angle generally toward the second side of each link assembly.

6. The conveyor belt of claim 5 wherein the central portion of each link assembly disposed generally between the first half and the second half of each link assembly, and wherein each link assembly further comprises at least one central rib having one portion formed at an angle extending generally toward the first end of each link assembly and a second portion formed at an angle extending generally toward the second end of each link assembly.

7. The conveyor belt of claim 5 wherein each forward shaft projection includes a projection link opening formed therethrough and wherein each rearward shaft projection includes a projection link opening formed through a portion thereof, and wherein the projection link openings in the forward shaft projections of one of the link assemblies are aligned with the projection link openings in the rearward shaft projections of one of the other link assemblies when the forward end of one of the link assemblies is disposed generally adjacent the rearward end of the one other link assembly for connecting the two link assemblies the aligned projection link openings in the forward and rearward shaft projections cooperating to form a shaft opening, and wherein the means for connecting each link assembly to one of the other link assemblies is defined further to comprise:
a plurality of link shafts, each link shaft being disposable through one of the shaft openings for connecting one of the link assemblies to one of the other link assemblies.

8. The conveyor belt of claim 1 defined further to comprise:
a plurality of belt ribs with each belt rib being disposed generally on the lower surface of each link assembly and each belt extending a distance from the lower surface of one of the link assemblies and each belt rib extending at an angle generally between the forward and the rearward ends of the link assemblies whereby material deposited on the lower surface of the link assemblies tends to be moved outwardly toward the opposite first and second sides of the link assemblies for tending to clean material from the lower surface of the link assemblies.

9. The conveyor belt of claim 1 wherein each link assembly is defined further as comprising a first half extending generally from the first side of the link assembly generally toward a central portion of the link assembly and a second half extending from the second side generally toward the central portion of of the link assembly, and wherein the belt ribs are defined further to as comprising a plurality of spaced apart first belt ribs with each first belt rib being disposed generally within the first half of one of the link assemblies and each belt rib extending at an angle generally toward the first side of the link assembly, and a plurality of second belt ribs with each second belt rib being disposed generally within the second half of one of the length assemblies and each belt rib extending at an angle generally toward the second side of one of the link assemblies.

10. A conveyor belt, comprising:
a plurality of link assemblies with each link assembly having a forward end, a rearward end, a first side and a second side, the forward end of each link assembly being connectable to the rearward end of one other link assembly for forming the conveyor belt, each link assembly comprising:
a first end link module having a first side and a second side, the second side of the first end link module being formed at an angle;
a second end link module having a first side and a second side with the first side of the second end link module being formed at an angle; and
a central link module having a first side and a second side with the first and the second sides each being formed at an angle, the first side of the central link module being disposed generally near the second side of the first end link module and the second end of the central link module being disposed generally near the first end of the second end link module in an assembled position of the first end link module, the second end link module, and the central link module to form one of the link assemblies, whereby when the forward end of one of the link assemblies is connected to the rearward end of the one of the other link assemblies to form the conveyor belt, the space between the first end link module and the central link module of one of the link assemblies is offset from the space between the first end link module and the central link module of an adjacent link assemblies and the space between the second end link module and the central link module of each of the link assemblies is offset from the space between the second end link module and the central link module of an adjacent link assembly.

11. The conveyor belt of claim 10 wherein the second end of the first end link module mates with the first end of the central module and the first end of the second end link module mates with the second end of the central link module.

12. A conveyor belt comprising:
a plurality of link assemblies, each link assembly having a forward end, a rearward end, a first side, a second side, an upper surface and a lower surface, the forward end of each link assembly link assemblies to form the conveyor belt;
a plurality of spaced apart forward shaft projections being formed generally near the forward end of each link assembly and spaced generally along the forward end of each link assembly with each forward shaft projection having a projection link opening formed therethrough, the projection link openings in the forward shaft projection being aligned to form a first shaft opening;
a plurality of rearward shaft projections being formed generally near the forward end of each link assembly and spaced generally along the forward end of each link assembly with each rearward shaft projection having a projection link opening formed therethrough, the projection link openings in the rearward shaft projection being aligned to form a first shaft opening, the first and the second shaft openings being aligned when the forward end of each of the link assemblies is disposed near the rearward end of one of the other link assemblies;
a plurality of link shafts, each link shaft being disposed through the aligned projection openings formed by two of the link assemblies for connecting the two link assemblies; and
wherein the projection link openings in the forward and rearward shaft projections each are generally circularly shaped and each has a diameter larger than the diameter of the link shaft disposed therethrough, the diameters of each of the projection link openings in the forward and the rearward shaft projections being sufficiently larger than the diameter of the link shaft whereby the link shaft rolls on the surfaces formed by the projection link openings in the forward shaft projections during the operation of the conveyor belt when the conveyor belt is tension and as the conveyor belt moves over a curved path for at least a portion of the time the conveyor belt is moved over the curved path.

13. The conveyor belt of claim 12 wherein the diameters of the projection link openings in the forward and rearward shaft projections are defined further as being sized whereby the link shaft disposed therethrough rolls on the surface formed by the projection link opening in the forward shaft projection at least in excess of fifty percent of the time the conveyor belt is being moved over the curved path.

14. A conveyor belt comprising:
a shaft;
a tracking sprocket having a plurality of teeth and opposite faces, the tracking sprocket being secured to the shaft;
at least one drive sprocket, each drive sprocket having a plurality of teeth disposed thereabout and each drive sprocket being secured to the shaft;
a plurality of link assemblies, each link assembly having a forward end, a rearward end, a first side, a second side, an upper surface and a lower surface with the forward end of each link assembly being connectable to the rearward end of one of the other link assemblies for forming the conveyor belt, a tracking sprocket groove being formed in the lower surface of each link assembly thereby forming a left engaging surface and a right engaging surface in the lower surface of each link assembly, each tracking sprocket groove being sized and shaped so that the teeth of the tracking sprocket alternatively are disposed in the tracking sprocket groove with the left engaging surface being engaging with a portion of one face of one of the teeth of the tracking sprocket for restraining lateral movement of the tracking sprocket in one direction and with the right engaging surface formed by each tracking sprocket groove being engaging with a portion of one other face of one of the teeth of the tracking sprocket for restraining lateral movement of the tracking sprocket in one other direction;
each of the link assemblies having a groove formed in a portion of the lower surface thereof sized and adapted to receive a portion of at least one of the teeth on the drive sprocket and a ridge formed on a lower surface of each of the link assemblies and extending a distance from the lower surface with each ridge being adapted to engage a portion of at least one of the teeth on the drive sprocket, the link assemblies being adapted so that when the link assemblies are connected in an assembled position to form the conveyor belt, the grooves in each of the link assemblies cooperate to form a plurality of grooves for alternatively receiving the teeth on the drive sprocket and a plurality of ridges for alternately engaging a portion of the teeth on the drive sprocket whereby the drive sprocket drivingly moves the conveyor belt, and the grooves permitting lateral movement of the conveyor belt in one direction generally toward the first side of the link assemblies and permitting lateral movement of the conveyor belt in another direction generally toward the second side of the link assemblies, the teeth of the drive sprocket being movable in the grooves in the link assemblies as the conveyor belt moves in the lateral directions;
means for connecting the forward end of each link assembly to the rearward end of one of the other link assemblies with the connected link assemblies forming the conveyor belt.

15. A conveyor belt adapted for tending to clean material deposited thereon therefrom, comprising:
a plurality of link assemblies, each link assembly having a forward end, a rearward end, an upper surface, a lower surface, a first side, and a second side, the forward end of each link assembly being connectable to the rearward end of one other link assembly for forming the conveyor belt, a plurality of belt ribs with each belt rib being disposed generally on the lower surface of each link assembly and each belt rib extending a distance from the lower surface of one of the link assemblies, and each belt rib extending at an angle generally between the forward and the rearward ends of the link assemblies whereby material deposited on the lower surface of the link assemblies tends to be moved outwardly toward the opposite first and second sides of the link assemblies for tending to clean material from the lower surface of the link assemblies.

16. The conveyor belt of claim 15 wherein each link assembly is defined further as comprising a first half extending generally from the first side of the link assembly generally toward a central portion of the link assembly and a second half extending from the second side generally toward the central portion of the link assembly, and wherein the belt ribs are defined further to as comprising a plurality of spaced apart first belt ribs with each first belt rib being disposed generally within the first half of one of the link assemblies and each belt rib extending at an angle generally toward the first side of the link assembly, and a plurality of second belt ribs with each second belt rib being disposed generally within the second half of one of the length assemblies and each belt rib extending at an angle generally toward the second side of one of the link assemblies.

17. A conveyor belt adapted to be moved over a support surface at least a portion of the time during the operation of the conveyor belt, comprising:
a belt having a first side, a second side, an upper surface and a lower surface, a plurality of spaced apart support ribs being formed on the lower surface of the belt and each support surface rib being spaced a distance from adjacent support surface ribs and each support surface rib extending at an angle, the support surface ribs engaging the support surface and moving material deposited on the support surface from the support surface for tending to clean material from the support surface.

18. The conveyor belt of claim 17 wherein the belt further comprises a first half extending from the first side of the belt a distance generally toward a central portion of the belt and a second half extending from the second side of the belt generally toward the central portion of the belt and wherein the support surface ribs are defined further as comprising a plurality of first support surface ribs disposed generally within the first half with each first support surface rib extending at an angle generally toward the first side of the belt, and a plurality of second support surface ribs with each second support surface rib being disposed generally within the second half and each second support surface rib extending at an angle generally toward the second side of the belt.

19. The conveyor belt of claim 18 wherein the central portion is disposed generally between the first half and the second half of the belt, and wherein the belt further comprises at least one central rib disposed generally within the central portion and having one portion formed at an angle extending generally toward the first side of the belt and a second portion formed at an angle extending generally toward the second side of the belt.

20. A conveyor belt adapted to clean material deposited thereon therefrom, comprising:
a belt having a first side, a second side, an upper surface and a lower surface, a plurality of spaced apart belt ribs being formed on the lower surface and each belt rib being spaced a distance from adjacent belt ribs and each belt rib extending a distance from the lower surface and each belt rib extending at an angle whereby material on the lower surface of the belt tends to be moved outwardly toward the opposite first and second sides of the belt for tending to clean material from the lower surface of the belt.

21. The conveyor belt of claim 20 wherein the belt further comprises a first half extending generally from the first side of the belt generally toward a central portion of the belt and a second half extending from the second side of the belt generally toward the central portion of the belt, and wherein the belt ribs further comprise a plurality of spaced apart first belt ribs with each belt rib being disposed generally within the first half and each first belt rib extending at an angle generally toward the first side of the belt, and a plurality of second belt ribs with each second belt rib being disposed generally within the second half of the belt and each second belt rib extending at an angle generally toward the second side of the belt.

* * * * *

UNITED STATES PATENT AND TRADEMARK OFFICE
CERTIFICATE OF CORRECTION

PATENT NO. : 5,020,656
DATED : June 4, 1991
INVENTOR(S) : William G. Faulkner It is certified that error appears in the above-identified patent and that said Letters Patent is hereby corrected as shown below:

Col. 1, line 47, please delete the word "tee"" and substitute therefor the word -- the --.

Col. 2, line 54, immediately following the word "only", please insert -- partially shown in Figure 2 and the dotted lines are not shown --.

Col. 6, line 56, please delete the numeral "60" and substitute therefor the numeral -- 28 --.

Col. 7, line 33, immediately following the phrase "until the link shaft 30", please insert -- reaches the bottom of the clearance between the projection --.

Col. 12, line 16, immediately following the numeral "234", please insert -- 236 and 238 is sized so that the adjoining edges between the --.

UNITED STATES PATENT AND TRADEMARK OFFICE
CERTIFICATE OF CORRECTION

PATENT NO. : 5,020,656

DATED : June 4, 1991

INVENTOR(S) : William G. Faulkner

It is certified that error appears in the above-identified patent and that said Letters Patent is hereby corrected as shown below:

Col. 15, line 21, immediately following the word "assembly", please insert -- being connectable to the rearward end of one of the --.

Signed and Sealed this

Sixth Day of July, 1993

Attest:

MICHAEL K. KIRK

Attesting Officer

Acting Commissioner of Patents and Trademarks